United States Patent [19]

Junkes

[11] Patent Number: 5,044,816
[45] Date of Patent: Sep. 3, 1991

[54] CLAMPING COLLAR WITH LONGITUDINAL RIBS

[75] Inventor: Peter E. Junkes, Hamburg, Fed. Rep. of Germany

[73] Assignee: Hydac Technology GmbH, Sulzbach, Fed. Rep. of Germany

[21] Appl. No.: 546,833

[22] Filed: Jul. 2, 1990

[30] Foreign Application Priority Data

Jul. 18, 1989 [DE] Fed. Rep. of Germany ... 8908688[U]

[51] Int. Cl.$^5$ ............................................. F16B 2/02
[52] U.S. Cl. ................................... 403/344; 403/312; 403/399; 285/13
[58] Field of Search ...................... 403/1, 234–235, 403/312, 344, 373, 398–399; 285/13–14

[56] References Cited

U.S. PATENT DOCUMENTS

| | | | |
|---|---|---|---|
| 713,135 | 11/1902 | Murdock | 403/344 X |
| 937,742 | 10/1909 | Walkner | 403/344 X |
| 1,018,263 | 2/1912 | Novitski | 403/344 X |
| 1,022,954 | 4/1912 | Lamb | 403/344 X |
| 1,201,706 | 10/1916 | Dodge | 403/344 |
| 1,405,342 | 1/1922 | Shaffer | 403/344 |
| 1,960,159 | 5/1934 | Lilek | 403/344 |
| 2,496,168 | 1/1950 | Lee et al. | 403/344 X |
| 2,676,025 | 4/1954 | Davis | 403/344 X |
| 3,958,425 | 5/1976 | Maroschak | 285/14 X |
| 4,417,711 | 11/1983 | Madej | 403/158 X |
| 4,565,464 | 1/1986 | Nilsson | 403/344 X |
| 4,616,949 | 10/1986 | Kellner | 403/344 X |
| 4,666,186 | 5/1987 | Twomey | 285/14 |

FOREIGN PATENT DOCUMENTS 11998 2/1925 Netherlands ................... 403/344

Primary Examiner—Andrew V. Kundrat
Assistant Examiner—Franco S. DeLiguori
Attorney, Agent, or Firm—Roylance, Abrams, Berdo & Goodman

[57] ABSTRACT

A clamping collar includes a clamping collar body extending along a longitudinal axis and having at least two clamping collar shells with side walls. At least one clamping receiving space is defined by the side walls of the collar shells for receiving and retaining a pipe in the space along the longitudinal axis. At least one recess in the side walls opens radially inwardly into the receiving space and extends axially parallel to the longitudinal axis. The recess is open to an atmosphere exteriorly of the collar body at at least one axial end of the recess.

8 Claims, 1 Drawing Sheet

CLAMPING COLLAR WITH LONGITUDINAL RIBS

FIELD OF THE INVENTION

The present invention relates to a clamping collar with a clamping collar body made up of at least two clamping body shells defining at least one clamping receiving space. The side walls of the clamping receiving space at least partially encompass the periphery of a pipe held in the clamping receiving space.

BACKGROUND OF THE INVENTION

Clamping collars in various different embodiments have been available on the commercial market for years. Clamping collars have been used in a wide variety of environmental conditions, including areas with a high moisture or humidity level in the vicinity of the device. With conditions of this sort, the problem of pipe corrosion very often arises in the area of the insertion and fitting of the pipe into the relevant clamping collar. Because of the poor fitting, water penetrates into the gaps between the pipe held in the clamping receiving space and the side walls of the clamping receiving space, causing corrosion of the pipe. In the process, the corrosion in the pipe that enters the clamping collar is aggravated to the extent that temperature changes in the environment favor a warm damp climate.

SUMMARY OF THE INVENTION

An object of the present invention is to provide a clamping collar providing some assurance in preventing pipe corrosion in pipes which are inserted into the clamping collar.

The foregoing object is obtained by a clamping collar, comprising a clamping collar body extending along a longitudinal axis and having at least two clamping collar shells with side walls. At least one clamping receiving space is defined by the side walls of the collar shells for receiving and retaining a pipe therein along the longitudinal axis. At least one recess in the side walls opens radially inwardly into the receiving space and extends axially parallel to the longitudinal axis. The recess is open to an atmosphere exteriorly of the collar body at at least one end of the recess.

By forming the clamping collar in this manner, moisture formed in the clamping receiving space in the gaps between the outside wall of the pipe and the side walls of the clamping receiving space can be conducted to the outside of the clamping collar and into the surrounding environment.

With uniform tightening torque of the screws which connect the clamping collar shells with one another to form a clamping collar body made up of the clamping shells, and with uniform surface pressure of the clamping collar on the pipe which is to be held tightly as with the traditionally used known clamping collars, the collection of water and condensation and the resulting corrosion occurring in a pipe incorporated into the clamping collar, for instance a steel pipe, is assuredly avoided.

In one preferred embodiment, longitudinal ribs extend between the recesses and are essentially parallel to the recesses, forming a contact surface for the pipe held in the clamping collar body. With known clamping collars of the aforementioned type it is traditional to incorporate splines or grooves in the clamping collar body for the purpose of obtaining weight reduction. Such conventional splines or grooves extend in the clamping collar body along the radial periphery of the pipe being held, but without opening to the outside. With an arrangement of the recesses, according to the present invention, extending parallel to the longitudinal axis of the pipe being held, longitudinal ribs forming the contact surface for the pipe are found between these recesses. The ribs need not be smaller than those in the known clamping collars in which the radially or circumferentially extending longitudinal ribs form the contact surface. Consequently, the contact surface for the pipe with ribbing according to the present invention remains essentially identical to the aforementioned and described known clamping collars.

With one especially preferred embodiment, the base of at least a portion of the relevant recess does not extend in a straight line or is not flat. Rather, the base has a progressively increasing projection toward the inside of the receiving space, preferably in the form of a convexity in the middle of the base of the recess.

Clamping collars according to the present invention can be formed of plastic parts manufactured by means of an injection molding tool in a injection molding process. The ribs in such plastic clamping collars run parallel to the longitudinal axis of the pipe received therein for plotting the configuration of the recesses in the clamping collar. A certain rudimentary distortion occurs during the cooling process. The distortion is in the form of a shrinkage, whereby the base of the relevant recess, insofar as this base is intended to run in a straight line according to the injection molding tool used, can obtain an indentation turned in some other direction form the inside of the recess, for instance in the form of a saucer, in which trapped water could be collected. This phenomenon is avoided with assurance when the injection molding tool is configured so that, even following the cooling process, the base of the recess of the clamping collar has a bulge toward the inside of the clamping receiving space and the ends of the recess drop down in an oblique line to the outside into the atmosphere. The moisture then found in the clamping collar in any space arrangement of the clamping collar runs outward into the atmosphere, even when the clamping collar is horizontal and the longitudinal axis of the pipe held extends in a horizontal plane.

In another preferred embodiment, at least in one portion of the recesses, the walls of each such recess are arranged closely facing one another and extend at an acute angle into one another. Then, an especially simple solution of the problems of the clamp collar is possible by use of the casting mold provided for that purpose.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF PREFERRED EMBODIMENTS

Figure 1:
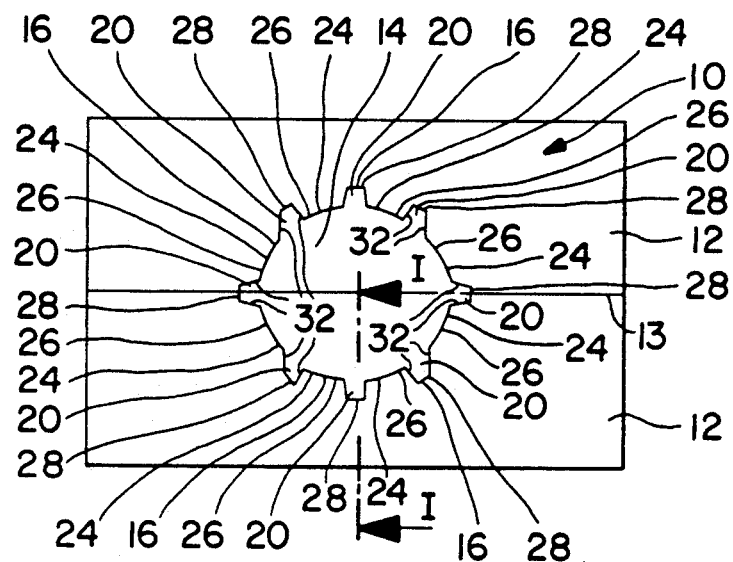
FIG. 1 is a side elevational view of a clamping collar according to a first embodiment of the present invention.

FIG. 1 shows a clamping collar comprising a clamping collar body indicated in its entirety as 10. The collar body is constructed essentially of two identical clamping collar shells 12. The two clamping collar shells 12 are connected with each other along a junction plane 13, which in the representation in FIG. 1 extends essentially in a horizontal plane. Traditional connection means, for instance screws, extend through and engage in boreholes 11 for connecting the two clamping collar shells 12 with each other (FIG. 2).

The two clamping collar shells 12, which essentially represent half shells, have adjacent surfaces turned toward one another which limit an essentially circular or cylindrical receiving space 14. The facing or axial ends of space 14 open into the atmosphere, and thus, into the surrounding environment.

Space 14 is provided to receive a pipe (not shown), for instance a steel pipe. The inside of the pipe can transport mediums of the most varied different types, for instance fluids. The diameter of receiving space 14, and thus, also the dimensions of the clamping collar itself are such that the pipe (not shown) received therein engages the contact surfaces 26 formed by the side walls 16 of the two clamping collar shells 12, whereby the pipe can be clamped tightly between these contact surfaces 26 into its fixed position.

Figure 2:
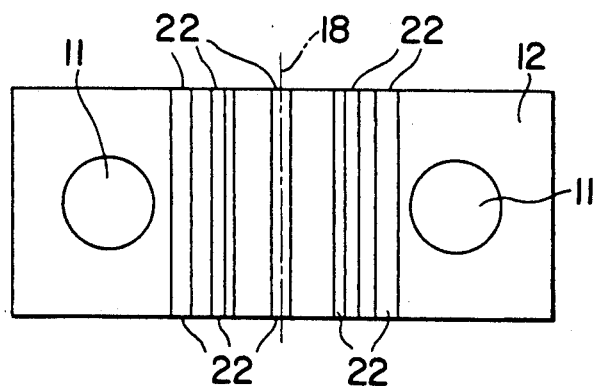
FIG. 2 is a top plan view of one shell of the clamping collar of FIG. 1.

The longitudinal axis 18 of the pipe held is represented in detail in FIG. 2, and extends essentially identically to the longitudinal axis of the inner peripheral surface of clamping shells 12 defining receiving space 14 of the clamping collar. Consequently, in the representation of the clamping collar shown in FIG. 1, longitudinal axis 18 extends essentially in a horizontal plane.

Eight recesses 20 extend parallel to longitudinal axis 18 in side walls 16 of receiving space 14. The recesses are in the form of grooves extending axially through clamping collar body 10. The grooves open or are connected in a radially inward direction with receiving space 14, and open axially into the atmosphere at their axial ends 22. Ends 22 are arranged so that they will lie closely facing each other in each case, to form a runoff gutter for moisture, especially in the form of water condensate.

The pipe (not shown) is tightly clamped to its attachment in receiving space 14 between longitudinal ribs 24. Ribs 24 have contact surfaces 26 on their sides turned toward one another. The moisture penetrating at the sides out of the environment into the inside of clamping collar 10 and collected between side walls 16 of space 14 and the outside periphery of the pipe (not shown) in the form of water and condensate, is discharged outward into the atmosphere through the recesses 20 serving as runoff gutters. The selection of the number of recesses 20, of which in the present exemplary embodiment eight is selected, is dependent upon the intended use of the article for which the clamping collar is to be used. The number of recess can vary widely depending upon the device and the intended use.

Figure 3:
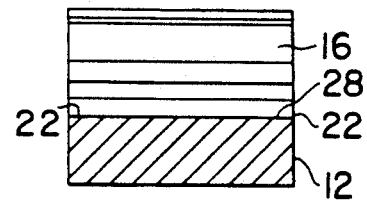
FIG. 3 is an end elevational view in section of the clamping collar taken along line I—I of FIG. 1.

In the first exemplary embodiment of the clamping collar, the base 28 of groove-shaped recess 20 extends essentially in a straight line and parallel to longitudinal axis 18 of the pipe (not shown) being incorporated therein, as is shown especially in FIG. 3. A consequential straight-line path or planar shape of base 28 is especially favored from the point of view of production, if the clamping collar is not to be made of plastic parts produced in the injection molding process, because a planar base 28 running in a straight line can be attained with only slight outlay and with a simple manufacturing process.

In the exemplary embodiment of the clamping collar, as shown and viewed in FIG. 1, the topmost and bottommost recesses 20 have axial walls arranged parallel to a vertically running plane; and such recesses are essentially rectangular in transverse cross-sectional configuration. The remaining six recess 20 each have generally radially extending axial walls 32 arranged closely facing one another and oriented relative to one another at acute angles. Such arrangement is especially favorable if the clamping collar is formed of an injection molded article, since the clamping collar can be released in an especially simple manner, for instance by an injection molding tool. Furthermore, at the meeting point of the two clamping collar shells along junction plane 13, the two recesses 20 are formed in common lying in junction plane 13, by the two clamping collar shells 12.

Figure 4:
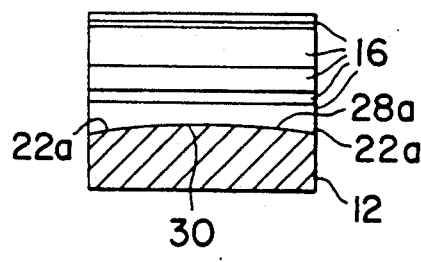
FIG. 4 is an end elevational view in section of one shell of a clamping collar according to a second embodiment of the present invention.

In the second exemplary embodiment shown in FIG. 4, the same parts as in the first exemplary embodiment are provided with the same references. When the parts are modified, the letter a is added.

In this second exemplary embodiment of the clamping collar according to the present invention, the base 28a of the relevant recess 20 is provided with a bulge 30 projecting inwardly toward the inside of clamping receiving space 14. This bulge 30 is configured in the form of a convexity. When viewed along the longitudinal axis 18 of the clamping collar, bulge 30 is arranged in the middle of base 28a of recess 20. The ends 22a of recess 20 drop obliquely relative to this bulge 30 to the outside, and also open into the outside atmosphere. This second exemplary embodiment is especially favored when the clamping collar is formed of plastic material and is produced by means of an injection molding method.

While various embodiments have been chosen to illustrate the invention, it will be understood by those skilled in the art that various changes and modifications can be made therein without departing from the scope of the invention as defined in the appended claims.

What is claimed is:

1. A clamping collar, comprising:
   a clamping collar body extending along a longitudinal axis and having at least two clamping collar shells with side walls;
   at least one clamping receiving space defined by said side walls of said collar shells for receiving and retaining a pipe therein along said longitudinal axis; and
   at least one recess in said side walls opening radially inwardly into said receiving space and extending axially parallel to said longitudinal axis, said recess being open to an atmosphere exteriorly of said collar body at at least one axial end of said recess and having a base including an axially extending bulge projecting radially inwardly toward said receiving space, said bulge projecting inwardly to define a highest point of said recess such that said recess increases constantly in depth along an axial direction from said highest point to said one axial end;

whereby said recess aerates and drains fluids to inhibit pipe corrosion.

2. A clamping collar according to claim 1 wherein a plurality of recesses extend in said side walls parallel to said longitudinal axis, said recesses being separated by longitudinal ribs extending essentially parallel to said recesses, said ribs forming a contact surface for engaging the pipe.

3. A clamping collar according to claim 2 wherein at least some of said recesses are rectangular in configuration.

4. A clamping collar according to claim 2 wherein at least some of said recesses are each at least partially defined by axial walls closely facing one another and oriented at an acute angle relative to each other.

5. A clamping collar according to claim 2 wherein said collar shells are joined at a meeting point, at least one of said recesses being formed at said meeting point and defined by both of said collar shells.

6. A clamping collar according to claim 2 wherein said highest point is located substantially at a longitudinal middle of each said recess.

7. A clamping collar according to claim 6 wherein each said recess gradually and constantly increases in depth from said highest point toward both axial ends of said recess, said recess being open to the atmosphere exteriorly of said collar body at both axis ends of each said recess.

8. A clamping collar according to claim 1 wherein said bulge comprises a convexity in a longitudinal middle of each said recess.

* * * * *